(No Model.)
W. ANDERSON.
REVOLVING PURIFIER FOR WATER.
No. 443,737. Patented Dec. 30, 1890.
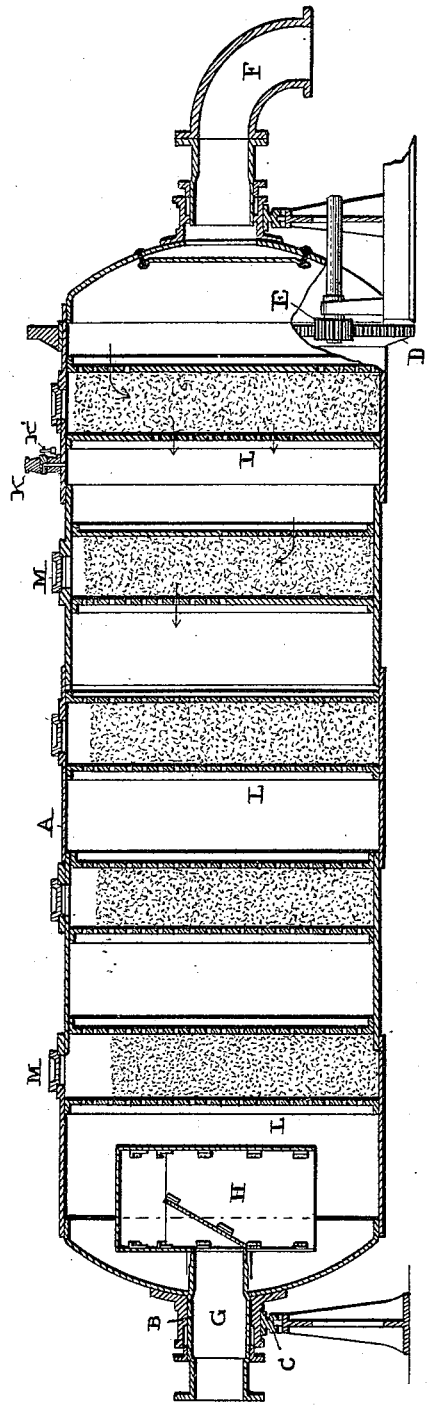
Witnesses
Storrs R. Clark
Charles M. Cattin
Inventor
Wm. Anderson
By his Attorneys
Dyer & Seely

UNITED STATES PATENT OFFICE.

WILLIAM ANDERSON, OF ERITH, ASSIGNOR TO THE REVOLVING PURIFIER COMPANY, LIMITED, OF LONDON, ENGLAND.

REVOLVING PURIFIER FOR WATER.

SPECIFICATION forming part of Letters Patent No. 443,737, dated December 30, 1890.

Application filed April 25, 1890. Serial No. 349,484. (No model.)

*To all whom it may concern:*

Be it known that I, WILLIAM ANDERSON, of Erith, county of Kent, England, and a subject of the Queen of Great Britain, have invented a new Revolving Purifier for Water, (Case D,) of which the following is a specification.

My invention relates to apparatus for purifying water by bringing it into intimate contact with iron particles; and my invention is illustrated in the accompanying drawing, which shows a longitudinal section of the apparatus.

A is a cylinder or chamber provided at its ends with bearings B, which revolve on journals C.

D E is a suitable gearing at one end for revolving the cylinder.

F is the water-inlet, preferably passing through the bearing of the cylinder, and G is the water-outlet.

H is a hood placed around the water-outlet.

L L are perforated plates or other open-work partitions arranged at intervals along the cylinder. Between the several pairs of plates I place a mass of spongy iron, iron filings, borings, other iron particles, or other purifying material. I preferably do not fill the space entirely full, but leave a little vacant space, so that the material may shift about as the cylinder revolves, and thus keep loose and clean by the friction of the particles among themselves; but the space may be entirely filled, if desired.

M M are covers, which may be removed for admitting or taking out the purifying material.

K is an air-valve with a weighted stem K', so arranged that the valve is held open when in its highest position, but is closed on its downward movement before the valve gets below the water.

In using the apparatus water enters at F and percolates through the material contained between the first pair of perforated partitions, thence through the second mass, and so on through each succeeding mass and out at G. Owing to the revolution of the cylinder and the arrangement of purifying material described, the water will pass through in a sinuous course, and will thus be brought in intimate contact with a large quantity of the purifying material in a short time.

It is evidently not essential that the whole of each plate be perforated. For example, the first plate may be provided with a circle of holes around its edge and the second with holes adjacent to its center; or the first may be perforated in, say, its lower half and the second in the opposite or upper half. The first of these arrangements is illustrated in the first pair of plates in the drawing and the other arrangement is illustrated in the second pair of plates.

After passing through this apparatus the water is conducted to any suitable settling-tank or filter-bed and then to the place of use.

Having thus described my invention, what I claim is—

1. The combination, in a water-purifier, of a revolving chamber and a series of open-work partitions at intervals along the length of the cylinder, with purifying material between them, said cylinder revolving on an axis approximately horizontal, whereby the movement of the cylinder agitates the purifying material, substantially as described.

2. The combination, in a water-purifier, of a revolving chamber and a series of open-work partitions arranged in pairs with purifying material between them and partially filling the space, substantially as described.

3. The combination, in a water-purifier, of a revolving chamber with a series of open-work partitions arranged in pairs, and removable covers between the partitions, substantially as described.

This specification signed and witnessed this 14th day of February, 1890.

WILLIAM ANDERSON.

Witnesses:
FRANCIS W. FRIGOUT,
OLIVER R. JOHNSON,
*Consulate General U. S. A., at London, England.*